United States Patent
Gunstone

(10) Patent No.: US 6,839,954 B2
(45) Date of Patent: Jan. 11, 2005

(54) REMOTE CONTROLLED INDEXER SYSTEM AND METHOD FOR MACHINING A PART SURFACE

(75) Inventor: Eric L. Gunstone, Sumner, WA (US)

(73) Assignee: The Boeing Company, Chicago, IL (US)

(*) Notice: Subject to any disclaimer, the term of this patent is extended or adjusted under 35 U.S.C. 154(b) by 70 days.

(21) Appl. No.: 10/329,158

(22) Filed: Dec. 24, 2002

(65) Prior Publication Data

US 2004/0120782 A1 Jun. 24, 2004

(51) Int. Cl.⁷ .................................................. B23Q 7/00
(52) U.S. Cl. ........................ 29/563; 29/33 P; 409/165; 409/168; 269/289 R
(58) Field of Search ................................. 29/33 P, 563; 483/15, 14; 409/165, 168, 198, 221, 224; 269/61; 74/824, 813 L; 198/345.2, 345.3, 346.1

(56) References Cited

U.S. PATENT DOCUMENTS

| | | | | |
|---|---|---|---|---|
| 3,576,540 A | * | 4/1971 | Fair et al. ....................... | 29/563 |
| 3,700,228 A | * | 10/1972 | Peale ........................... | 269/61 |
| 3,854,889 A | * | 12/1974 | Lemelson .................... | 29/33 P |
| 4,318,465 A | * | 3/1982 | Calvert et al. .......... | 198/341.02 |
| 4,545,106 A | * | 10/1985 | Juengel ........................ | 29/563 |
| 4,685,661 A | * | 8/1987 | Slocum et al. ................ | 269/20 |
| 6,074,329 A | * | 6/2000 | Hirano et al. ................. | 29/563 |
| 6,682,276 B2 | * | 1/2004 | Harami et al. .............. | 409/137 |
| 6,708,385 B1 | * | 3/2004 | Lemelson .................... | 29/563 |
| 2002/0021685 A1 | * | 2/2002 | Sakusabe .................... | 370/338 |

* cited by examiner

Primary Examiner—A. L. Wellington
Assistant Examiner—Dana Ross
(74) Attorney, Agent, or Firm—Shimokaji & Associates, P.C.

(57) ABSTRACT

The present invention provides a remote controlled machine axis (or indexer) system that comprises a horizontal base plate, a first vertical plate, and a second vertical plate, wherein the first vertical plate and the second vertical plate are coupled to the horizontal base plate. The system further comprises a first arbor coupled to the first vertical plate, a second arbor coupled to the second vertical plate, a bearing positioned through the first vertical plate and the first arbor, a rotatable base plate coupled to the first arbor and to the second arbor, and a vice coupled to the rotatable base plate. The system also comprises a wireless transceiver coupled to the horizontal base plate, a servomotor coupled to the wireless transceiver and to the horizontal base plate, an integrated power source coupled to the servomotor, to the wireless transceiver, and to the horizontal base plate, and a reducer coupled to the integrated servomotor and to the second vertical plate.

25 Claims, 4 Drawing Sheets

REMOTE CONTROLLED INDEXER SYSTEM AND METHOD FOR MACHINING A PART SURFACE

BACKGROUND OF THE INVENTION

The present invention generally relates to machine pallet systems and, more specifically, to a remote controlled indexer system and method for machining a part surface.

Most conventional machined part surfaces are oriented to a spindle and cutter by fixturing, while the surfaces are generated by a side or end of the cutter. Occasionally a surface cannot be orientated perpendicular or parallel to the spindle without re-fixturing, so the surface is generated by a technique called hemstitching. Hemstitching involves moving a ball type cutter across a surface with passes so close that the surface appears to be smooth. This technique could require hundreds of cutter paths (instead of just a few) costing hours of valuable machine time. Although hemstitching can produce angled surfaces, there are occasions where the part must be rotated to access features to be generated on the part. This would require additional fixturing and repositioning on a machine that does not have enough axes to orientate the part to the desired position. This is not cost effective when a factory can produce over a thousand different part types on a single machining center with less than fifty fixture pallets available to use.

Another common alternative is for the factory to put these parts on their 5-axis palletized machines. These palletized machines typically have a work envelope of approximately 1 cubic meter or larger and are typically reserved for heavy complex machining on large parts due to the expense of the palletized machines, and the high cost of operating them. Some 5-axis machines are dedicated to build parts that could fit in a 6" cube and weigh about 6 oz. This is not the best use of the palletized machines but it is currently the best option because of machine capacity issues in other areas.

There are instances where many parts could be machined more cost effectively on 5-axis palletized machines than on 4-axis palletized machines. However, 5-axis machines are more expensive and require more maintenance. Several small parts on a 5-axis machine could be formed using a 4-axis machine if a $5^{th}$ axis rotary table was added. The rotary table would enable a spindle (in a factory machining center) to be perpendicular or parallel to the part, which is the optimal condition for milling.

There are several multi-axis devices available to resolve these problems, but most are hard wired to the palletized machine, or are limited by their positioning ability. This prevents an automated pallet shuttle system in the factory from moving pallets in and out of the machine. The most common type of multi-axis device uses the same power source as the palletized machining center and is wired directly to a machine controller. This common multi-axis device typically works in conjunction with the other axes in the palletized machine to produce full contouring capabilities. Another device is available that can position the part for cutting. This other device is a mechanical device that is operated by either the rotation of a spindle in the machining center, or the spindle holding a device that can "push into" the axis for a ratcheting effect. The accuracy, reliability, and functionality of these mechanical devices are claimed to be very poor, and interrupt the automated machining process.

If a remote controlled multi-axis device were available, an option of cutting these parts on lower cost 4 axis machines rather than 5 axis machines would exist. This would allow the factory to move the parts to different machine types depending on the current workloads for the machines.

As can be seen, there is a need for adding an additional axis onto a machine pallet, to enable the machine pallet to be shuttled through a pallet handling system and into a machining center without making additional connections.

SUMMARY OF THE INVENTION

In one aspect of the present invention, a remote controlled machine axis (or indexer) system comprises a horizontal base plate, a first vertical plate, and a second vertical plate, wherein the first vertical plate and the second vertical plate are coupled to the horizontal base plate. The system further comprises a first arbor coupled to the first vertical plate, a second arbor coupled to the second vertical plate, a bearing positioned through the first vertical plate and the first arbor, a rotatable base plate coupled to the first arbor and to the second arbor, and a vice coupled to the rotatable base plate. The system also comprises a wireless transceiver coupled to the horizontal base plate, an integrated servomotor coupled to the wireless transceiver and to the horizontal base plate, an integrated power source coupled to the servomotor, to the wireless transceiver, and to the horizontal base plate, and a reducer coupled to the servomotor and to the second vertical plate.

In another aspect of the present invention, an indexer comprises a wireless transceiver able to transmit and receive digital communications, an integrated servomotor coupled to the wireless transceiver, an integrated power source coupled to the servomotor and to the wireless transceiver, and a reducer coupled to the servomotor, wherein the integrated power source is portable and rechargeable.

In a further aspect of the present invention, an indexer system comprises a housing and a part coupled to the housing. The housing comprises a wireless transceiver able to transmit and receive digital communications, a servomotor coupled to the wireless transceiver, an integrated power source coupled to the servomotor and to the wireless transceiver, and a cycloidal reducer coupled to the servomotor, wherein the wireless transceiver, the servomotor, the integrated power source, and the cycloidal reducer are coupled to a machine pallet, wherein the machine pallet can be routed through a machining center that includes a cutting object, and wherein the cutting object can shape the part in a plurality of axes.

In yet another aspect of the present invention, an indexer system, comprises means for defining a machining angle of an axis, means for converting the machining angle of the axis by a first module (such as a processor in the controller) into a form understood by a second module (such as a wireless transceiver), means for wirelessly transmitting the converted machining angle to the second module, means for transmitting the converted machining angle to a third module (such as a servomotor), means for moving a fourth module (such as a rotating steel base plate) to the converted angle by the third module, wherein the fourth module is coupled to a part, and means for cutting a surface of the part along the converted angle, wherein the means for moving provides a fifth cutting axis to a four axis system.

In yet a further aspect of the present invention, a method for machining a part surface comprises defining a machining angle of an axis, converting the machining angle of the axis by a first module into a form understood by a second module, wirelessly transmitting the converted machining angle to the second module, transmitting the converted machining angle to a third module, moving a fourth module to the converted angle by the third module, wherein the fourth module is coupled to a part, and cutting a surface of the part along the converted angle.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides an additional axis mounted to a machine pallet that uses portable batteries as a power source, and connects to a machine controller via wireless communication. This feature, coupled with an integrated servomotor and reducer, enables the present device to maintain a high degree of accuracy and torque with high rigidity in a compact portable package. It also eliminates the need for external power and communication connections. The device has the ability to communicate back to the controller once in position to assure that everything is functioning properly. The compact, wireless design of the device enables the machine pallet to be shuttled through a pallet handling system and into the machining centers without making additional connections, or interrupting the automated machining process. The present invention further provides an ability to orientate the part surface perpendicular to the spindle on a typical 4-axis machine, so that it may be cut in fewer passes than using the hemstitching method described earlier.

Figure 1:
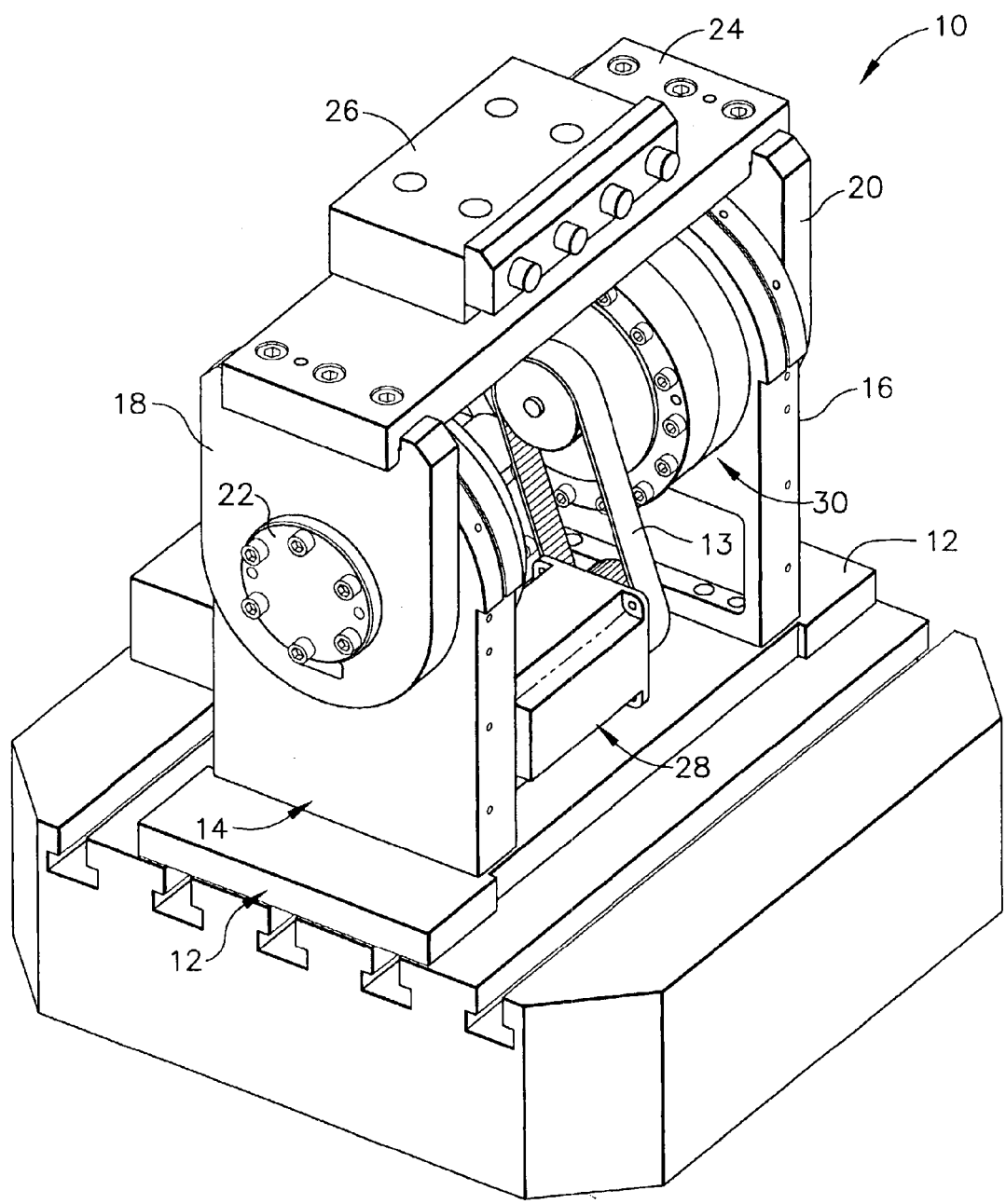
FIG. 1 is a side view of a remote controlled indexer system in accordance with the present invention.
Figure 2:
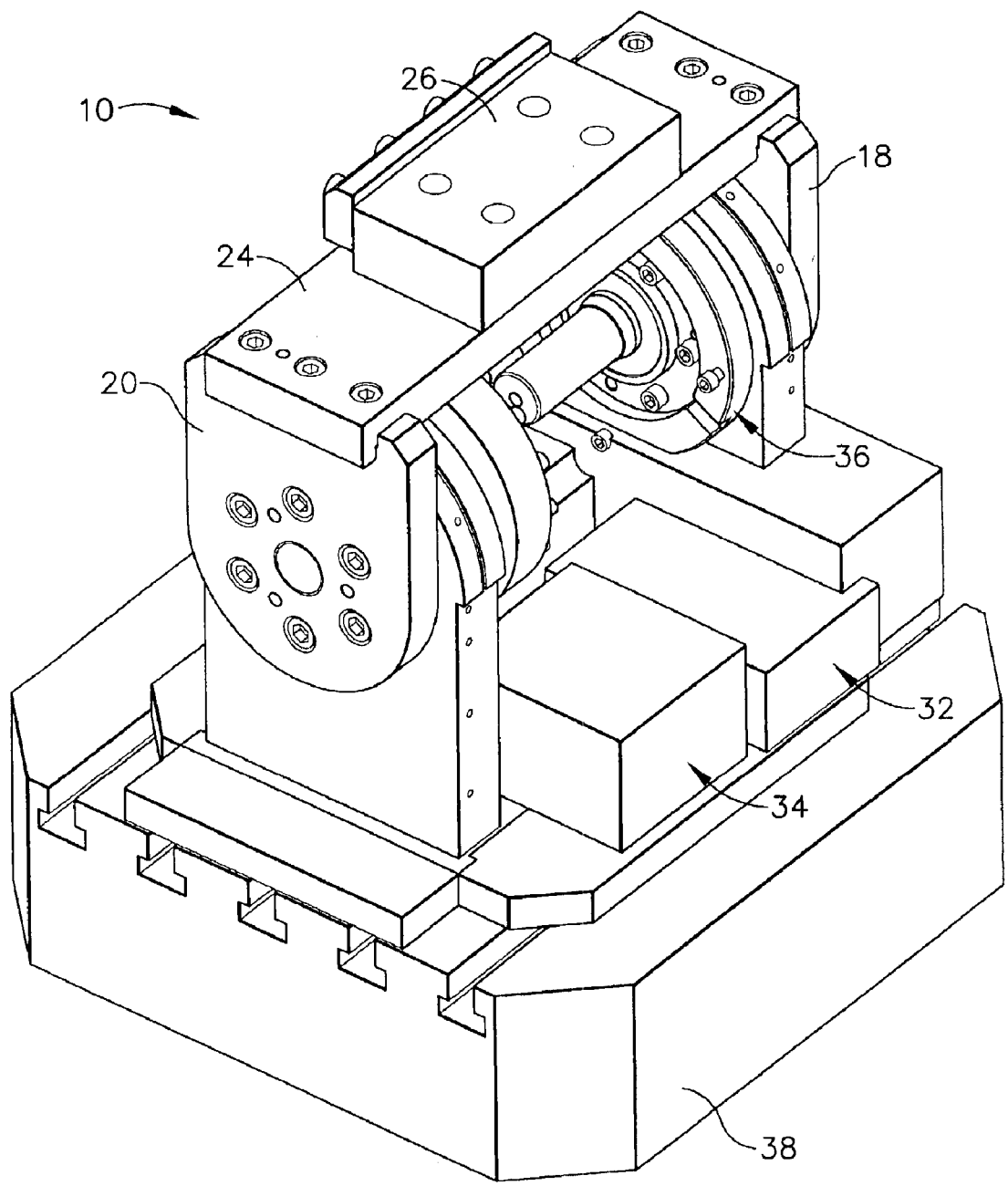
FIG. 2 is an opposite side view of the remote controlled indexer system in accordance with the present invention.

Referring now to FIGS. 1 and 2, a remote controlled indexer system 10 of the present invention is depicted. The indexer system 10 may comprise a horizontal base plate 12, a first vertical plate 14, and a second vertical plate 16, wherein the first vertical plate and the second vertical plate are coupled to the horizontal base plate. The system 10 may further comprise a first arbor 18 coupled to the first vertical plate 14, a second arbor 20 coupled to the second vertical plate 16, a bearing 22 positioned through the first vertical plate and the first arbor, a rotatable base plate 24 coupled to the first arbor and to the second arbor, and a vice 26 coupled to the rotatable base plate. The system 10 can also comprise a high torque servomotor 28 coupled to the horizontal base plate 12, a reducer 30 coupled to the servomotor and to the second vertical plate 16, a wireless transceiver 32 coupled to the horizontal base plate and to the servomotor 28, an integrated power source 34 coupled to the servomotor, to the wireless transceiver, and to the horizontal base plate, and an electro-mechanical brake 36 coupled to the servomotor and to the first vertical plate.

The system 10, described by reference numerals 12–34, may be placed on a machine pallet 38. More specifically, the horizontal base plate 12 can be coupled to the machine pallet 38, which can then be coupled to a rotary table 11 in a machining center 31. The machining center 31 can include a machine spindle 35 that can hold a cutter 37. A part may be coupled to the vise 26 and, when the system 10 on the machine pallet 38 is placed on the rotary table and shuttled through the machining center, the cutter can cut or shape the part in a plurality of axes (one of which can be formed by the rotatable indexer system 10).

Various components of the indexer system 10 can perform certain actions based on instructions wirelessly received by the transceiver 32 from a machine controller 33. The wireless transceiver 32, which can wirelessly transmit digital communications to the machine controller, may be a spread spectrum radio modem that uses advanced digital signal processing. The wireless transceiver 32 may preferably operate in the license-free 2.4 GHz ISM band and in high interference environments. The ISM (Instrumentation, Scientific, and Medical) band is a publicly owned portion of the radio spectrum that can operate in the 900 MHz, 2.4 GHz, and 5 GHz ranges. A programmer or user can enter a value into a program (such as a machining center control program) that defines a desired angle of the axis. The machining center's controller 33 outputs this value through an external port into the wireless transceiver 32. A code that defines this value is then processed by the controller that is integrated into the servomotor 28. The servomotor 28 moves to a position based on the defined value and then sends back a signal acknowledging that it moved to the proper position. The integrated servomotor 28 may include a controller, an encoder, a driver, and a motor.

The integrated power source 34 for the pallet side of the system 10 may be portable, rechargeable, and operate at about 12 VDC to about 24 VDC, and preferably at about 24 VDC. Power from the integrated power source 34, which is not wired to a machine controller, can be used to drive the servomotor 28, which in turn drives the reducer 30 (a belt 13 couples the reducer to the servomotor). The reducer 30 can be a cycloidal reducer, which contains no shear point, absorbs greater shock loading, and includes a smaller drive than conventional reducers, and is completely grease lubricated, eliminating the oily residue from chains and sprockets. The reducer 30 increases the torque of the integrated servomotor 28 by reducing the output revolutions from the input such as by about 141:1. This reduced output revolution can also prevent any forces from machining to back drive the system 10. To prevent back driving even further, the electro-mechanical brake 36 can be used to hold the axis rigid if the power source 34 is removed. This prevents the arbors 18, 20, the rotatable base plate 24, and the vice 26 from rotating or moving during the machining process.

Using the 2.4 GHz digital signal processor signal can allow up to approximately 79 different devices to operate on the same frequency in the same area. This will enable the factory to use multiple machines with up to approximately 79 pallets in the pallet handling system. An operator, loading and unloading parts, can replace an existing power source 34, as its voltage drops below a useable level, with a fully powered unit. Due to a minimal motion of the axis for most part configurations, the life of the power source 34 may be about one week per charge for continuous operation. A protective cover can enclose the entire system 10 so as to shield the components from chips, coolant, and other debris. Further, there may be a separate area for a power source 34 enclosure so that any contamination caused by changing the power source will not corrupt any of the components such as the servomotor 28 or the wireless transceiver 32.

Figure 3:
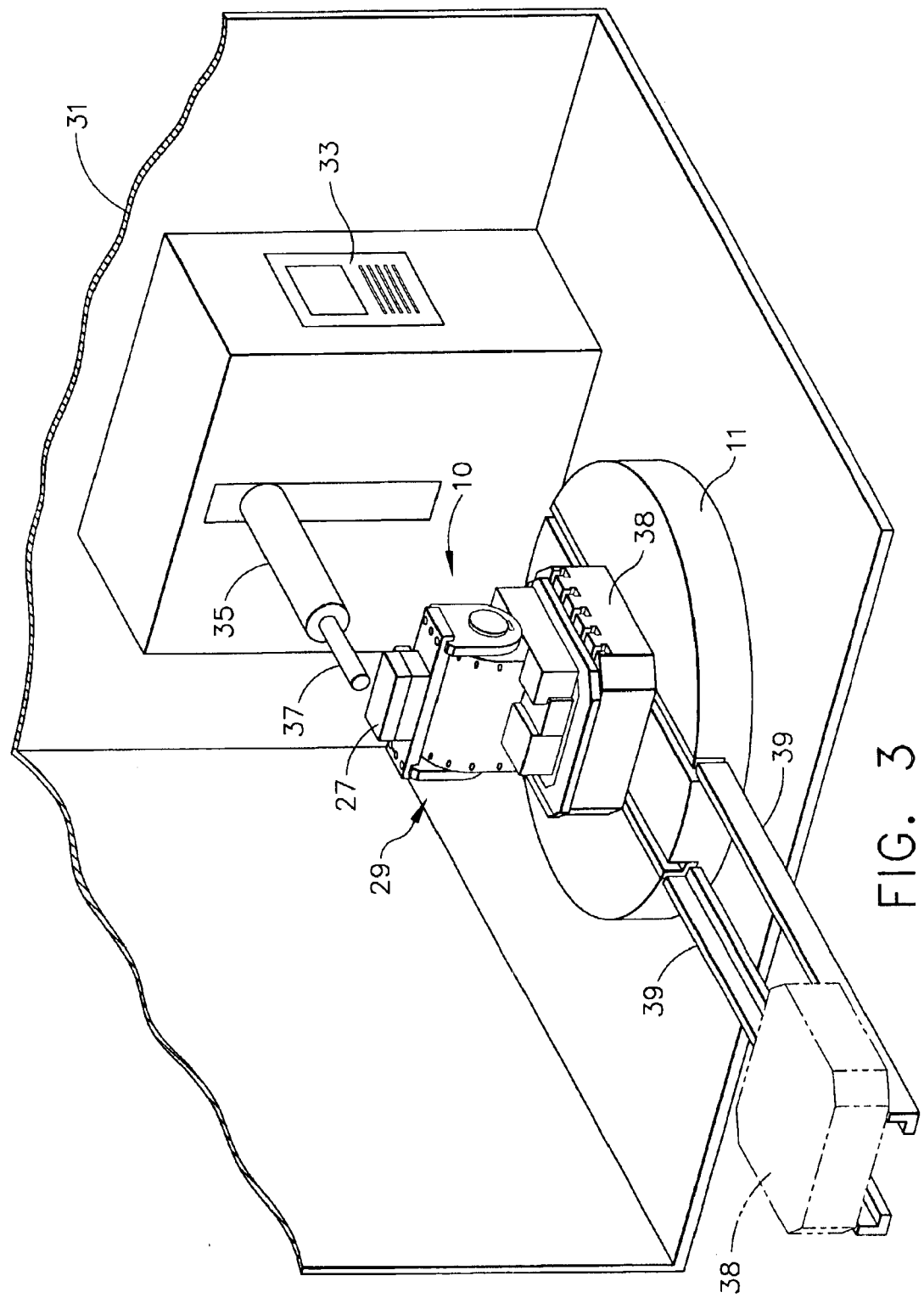
FIG. 3 is a view of an indexer system coupled to a machine pallet being shuttled through a pallet handling system in accordance with the present invention.

Referring now to FIG. 3, another embodiment of the present invention is depicted. Such an embodiment comprises an indexer or fixture 10 coupled to a pallet 38 (for example, a machine pallet), placed on a pallet handling system (such as the pallet shuttle rails 39), and shuttled through a machining center 31. The indexer 10 may comprise a wireless transceiver 32 able to transmit and receive digital communications (via infra-red or radio frequency communication, for example), a servomotor 28 coupled to the wireless transceiver, an integrated power source 34 coupled to the servomotor and to the wireless transceiver, and a reducer 30 coupled to the servomotor.

In a further embodiment, an indexer system 10 comprises a housing 29 (such as, a rigid enclosure) and a part or workpiece 27 coupled to the housing (for example, the part may be coupled directly to the housing or to a device, such as a vice 26, coupled to the housing). The housing 29 may house the indexer system 10 depicted in FIGS. 1 and 2, or other variations thereof. Such variations may comprises a wireless transceiver 32 able to transmit and receive digital communications, a servomotor 28 coupled to the wireless transceiver, an integrated power source 34 coupled to the servomotor and to the wireless transceiver, and a reducer 30 coupled to the servomotor, wherein the wireless transceiver, the servomotor, the integrated power source, and the reducer are coupled to a machine pallet 38, wherein the machine pallet can be routed through a machining center 31 that includes a cutting object/cutter 37, and wherein the cutting object can shape the part in a plurality of axes. The machine pallet 38 can be routed through the machining center 31 without making additional connections.

In yet another embodiment, an indexer system, comprises means for defining a machining angle of an axis, means for converting the machining angle of the axis by a first module (such as a processor in the controller) into a form understood by a second module (such as a wireless transceiver), means for wirelessly transmitting the converted machining angle to the second module, means for transmitting the converted machining angle to a third module (such as a servomotor), means for moving a fourth module (such as a rotating steel baseplate) to the converted angle by the third module, wherein the fourth module is coupled to a part, and means for cutting a surface of the part along the converted angle, wherein the means for moving provides a fifth cutting axis to a four axis system. The means for moving can also provide a fourth cutting axis to a three axis system.

Figure 4:
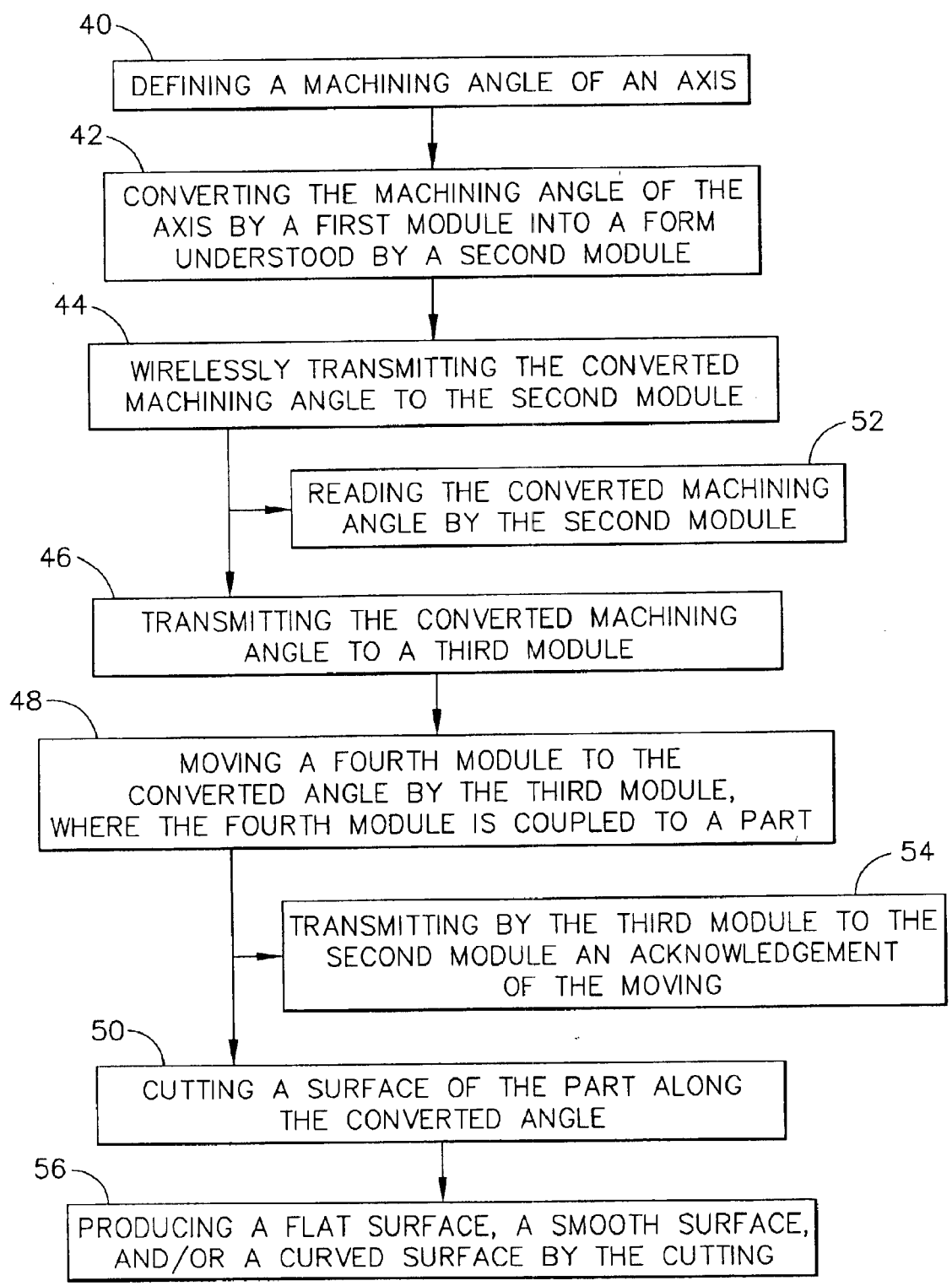
FIG. 4 is a flow chart depicting a method for machining a part surface in accordance with the present invention.

Referring now to FIG. 4, a method for machining a part surface is depicted. The method can begin at step 40 by defining a machining angle of an axis, at step 42 by converting the machining angle of the axis by a first module into a form understood by a second module, and at step 44 by wirelessly transmitting the converted machining angle to the second module. The method can proceed at step 46 by transmitting the converted machining angle to a third module, at step 48 by moving a fourth module to the converted angle by the third module, wherein the fourth module is coupled to a part, and at step 50 by cutting a surface of the part along the converted angle.

The method may further comprise the following steps, reading the converted machining angle by the second module after wirelessly transmitting the converted machining angle 52, transmitting, by the third module to the second module, an acknowledgement of the moving 54, and producing a flat surface, a smooth surface, and/or a curved surface by the cutting 56.

As can be appreciated by those skilled in the art, the present invention provides a remotely controlled indexer system that includes a wireless transceiver, a servomotor, an integrated power source, and a reducer. Such an indexer system allows a factory to move work to the machines that need work, and that are most cost effective at producing various parts. Further, fabrication time on detail parts that are currently hemstitched can be minimized by reducing the number of passes required to produce a part surface.

It should be understood, of course, that the foregoing relates to preferred embodiments of the invention and that modifications may be made without departing from the spirit and scope of the invention as set forth in the following claims.

I claim:

1. A portable remote controlled indexer system, comprising:
   a horizontal base plate;
   a first vertical plate;
   a second vertical plate, wherein the first vertical plate and the second vertical plate are coupled to the horizontal base plate;
   a first arbor coupled to the first vertical plate;
   a second arbor coupled to the second vertical plate;
   a bearing positioned through the first vertical plate and the first arbor;
   a rotatable base plate coupled to the first arbor and to the second arbor;
   a vice coupled to the rotatable base plate;
   a first multiplex wireless transceiver coupled to the horizontal base plate;
   said first multiplex wireless transceiver including a same frequency multisignal processor;
   a servomotor coupled to the wireless transceiver and to the horizontal base plate;
   an integrated power source coupled to the servomotor, to the wireless transceiver, and to the horizontal base plate;
   a reducer coupled to the servomotor and to the second vertical plate; and
   a plurality of machining centers, each of which includes a wireless transceiver including a same frequency multisignal processor in communication with said first multiplex wireless transceiver.

2. The remote controlled indexer system of claim 1 further comprising an electra-mechanical brake coupled to the servomotor and to the first vertical plate.

3. The remote controlled indexer system of claim 1, wherein a controller can wirelessly transmit and receive digital communications between the wireless transceiver.

4. The remote controlled indexer system of claim 1, wherein the integrated power source is portable.

5. The remote controlled indexer system of claim 1, wherein the integrated power source is rechargeable.

6. The remote controlled indexer system of claim 1, wherein a machine pallet can be coupled to the horizontal base plate.

7. The remote controlled indexer system of claim 6, wherein the machine pallet can be coupled to a rotary table in a machining center.

8. The remote controlled indexer system of claim 7, wherein the machining center includes a machine spindle.

9. The remote controlled indexer system of claim 8, wherein a part can be coupled to the vise, and wherein a cutter can be coupled to the machine spindle.

10. The remote controlled indexer system of claim 9, wherein the cutter can shape the part in a plurality of axes.

11. The remote controlled indexer system of claim 10, wherein one of the axes can be formed by the rotatable base plate.

12. The remote controlled indexer system of claim 1, wherein a belt couples the reducer to the servomotor.

13. A portable indexer coupled to a pallet, placed on a pallet handling system, and shuttled through a machining center, the indexer comprising:
  a first wireless transceiver able to transmit and receive digital communications;
  said first wireless transceiver including a same frequency multisignal processor;
  an integrated servomotor coupled to the wireless transceiver;
  an integrated power source coupled to the integrated servomotor and to the wireless transceiver;
  a reducer coupled to the integrated servomotor; and
  a plurality of the machining centers each of which includes a wireless transceiver including a same frequency multisignal processor in communication with said first wireless transceiver.

14. The indexer of claim 13, wherein the wireless transceiver transmits and receives digital communications via infra-red communication.

15. The indexer of claim 13, wherein the wireless transceiver transmits and receives digital communications via radio frequency communication.

16. A portable indexer system, comprising:
  a housing, the housing comprising:
  a first multiplex wireless transceiver able to transmit and receive digital communications;
  said first multiplex wireless transceiver including a same frequency multisignal processor;
  an integrated servomotor coupled to the first multiplex wireless transceiver;
  power source coupled to the servomotor and to the first multiplex wireless transceiver; and
  a cycloidal reducer coupled to the integrated servomotor; and
  a part coupled to the housing;
  wherein the first multiplex wireless transceiver, the integrated servomotor, the power source, and the cycloidal reducer are coupled to a machine pallet;
  wherein the machine pallet can be routed through a plurality of machining centers each of which includes a wireless transceiver including a same frequency multisignal processor in communication with said first multiplex wireless transceiver and that include a cutting object; and
  wherein the cutting object can shape the part in a plurality of axes.

17. The indexer system of claim 16, wherein the indexer system and the machine pallet are electrically independent from the machining center.

18. A portable indexer system, comprising:
  means for defining a machining angle of an axis by a first module into a form understood by a second module;
  means for converting the machining angle of the axis by a first module into a form understood by the second module;
  means for wirelessly transmitting the converted machining angle to the second module;
  means for transmitting the converted machining angle to a third module;
  means for moving a fourth module to the converted angle by the third module, wherein the fourth module can be coupled to a part; and
  means for cutting a surface of the part along the converted angle, wherein the means for moving provides a fifth cutting axis to a four axis system;
  means for wirelessly transmitting with a controller capable of same frequency multi-signal communication in a machine center.

19. A method for machining a part surface, comprising:
  defining a machining angle of an axis of the part surface;
  converting the machining angle of the axis by a first module into a form understood by a second module;
  wirelessly transmitting the converted machining angle to the second module;
  transmitting the converted machining angle to a third module;
  moving a fourth module to the converted angle by the third module, wherein the fourth module can be coupled to a part; and
  cutting a surface of the part along the converted angle;
  wherein the wirelessly transmitting is with a controller capable of same frequency multi-signal communication in a machine center.

20. The method of claim 19 further comprising transmitting, by the third module to the second module, an acknowledgement of the moving.

21. The method of claim 19 further comprising reading the converted machining angle by the second module after wirelessly transmitting the converted machining angle.

22. The method of claim 19 further comprising producing a flat surface by the cutting.

23. The method of claim 19 further comprising producing a smooth surface by the cutting.

24. The method of claim 19 further comprising producing a curved surface by the cutting.

25. The method of claim 19 further comprising cutting a surface of the part along five cutting axes.

\* \* \* \* \*